United States Patent [19]
Bills et al.

[11] Patent Number: 5,902,932
[45] Date of Patent: May 11, 1999

[54] FORCE BALANCING CAPACITANCE MANOMETER

[75] Inventors: Daniel Granville Bills, Boulder; Wilbert Leonard Porter, Mancos, both of Colo.

[73] Assignee: Granville-Phillips Company, Boulder, Colo.

[21] Appl. No.: 09/004,776

[22] Filed: Jan. 9, 1998

[51] Int. Cl.[6] ............................... G10L 9/00; G10L 7/00
[52] U.S. Cl. ................................................. 73/701; 73/749
[58] Field of Search .......................... 73/718, 719, 701, 73/706, 721, 730, 751, 729.1, 747, 749; 361/288.3

[56] References Cited

U.S. PATENT DOCUMENTS

| | | |
|---|---|---|
| 3,657,630 | 4/1972 | Fiet ............................................ 73/701 |
| 3,664,237 | 5/1972 | Paros . |
| 3,783,693 | 1/1974 | Paros . |
| 3,832,618 | 8/1974 | Levesque et al. . |
| 3,841,158 | 10/1974 | Hunter . |
| 3,884,079 | 5/1975 | Turtle et al. . |
| 3,900,460 | 8/1975 | Dehnert . |
| 4,292,850 | 10/1981 | Bachem . |
| 4,393,714 | 7/1983 | Schmidt . |
| 4,413,523 | 11/1983 | Claxton et al. . |
| 4,423,638 | 1/1984 | Tward ....................................... 73/749 |
| 4,836,028 | 6/1989 | Voituriez . |
| 4,870,536 | 9/1989 | Delatorre . |
| 4,875,368 | 10/1989 | Delatorre . |
| 5,056,369 | 10/1991 | Tamai et al. . |
| 5,317,948 | 6/1994 | Blaha . |
| 5,343,756 | 9/1994 | Nakamura et al. . |
| 5,357,806 | 10/1994 | Dennis et al. . |
| 5,388,462 | 2/1995 | Delatorre . |
| 5,457,999 | 10/1995 | Feldman ................................. 73/729.1 |
| 5,515,711 | 5/1996 | Hinkle . |
| 5,528,452 | 6/1996 | Ko . |

FOREIGN PATENT DOCUMENTS

| | | |
|---|---|---|
| 213638 | 2/1961 | Germany . |
| 524983 | 8/1976 | U.S.S.R. . |
| 2010201 | 3/1994 | U.S.S.R. . |

*Primary Examiner*—William Oen
*Attorney, Agent, or Firm*—Sixbey Friedman Leedom & Ferguson, P.C.; Gerald J. Ferguson, Jr.

[57] ABSTRACT

An apparatus for measuring the differential pressure between at least two fluids including (a) first and second pressure enclosures; (b) first and second pressure deformable members where the first deformable member is sealingly connected to the first pressure enclosure and second deformable member is sealingly connected to the second pressure enclosure and the pressure deformable members are rigidly linked so as to move as one unit; (c) a frame for locating the first and second pressure enclosures in fixed relationship to one another; (d) a position sensing device for determining the displacement of the pressure deformable members relative to the frame; (e) a force balancing device including a first portion rigidly connected to the frame and a moveable second portion connected to the pressure deformable members; and (f) a transducer for transducing the displacement of the first and second pressure deformable members into a force acting on the moveable second portion of the force balancing device in a direction to decrease the displacement.

62 Claims, 2 Drawing Sheets

FORCE BALANCING CAPACITANCE MANOMETER

FIELD OF THE INVENTION

The present invention relates to a force balancing manometer for measuring differential pressure over a wide range.

BACKGROUND OF THE INVENTION

There is a fast growing need for accurate measurement of pressures and differential pressures of pure gases as well as mixtures of gases in vacuum systems used in the manufacture of computer chips and similar high technology devices. So-called capacitance manometers because of their cleanliness and sensitivity are widely used for this purpose almost to the exclusion of all other types of devices.

In a capacitance manometer, a relatively thin diaphragm separates the gas in pressure chamber 1 from the gas in chamber 2. A pressure differential across the diaphragm causes it to be deflected until the deformation induced force is equal to the pressure induced force. A capacitance probe is used to determine the amount of deflection which may then be related to the pressure difference across the diaphragm.

Capacitance manometers suffer from a number of deficiencies. For example:

1. In order to measure small differential pressures, the diaphragm must be thin and flat so that the spring rate is very small. However, a thin flat diaphragm is easily damaged by excessive stresses caused by over pressure conditions. Various diaphragm support means are known but costly over pressure accidents still occur. Because the flat diaphragm deforms in a complex shape, effective stops are also relatively expensive to machine.
2. Because of the use of a thin flat diaphragm, capacitance manometers have limited pressure range, typically only four decades. Therefore, multiple manometer heads must be installed to provide pressure measurement over the 7 or 8 decades of pressure range typically required.
3. Because the diaphragm is purposely deformed during the measuring process, capacitance manometers are extremely sensitive to changes in material properties with temperature or age.
4. Capacitance manometers have sensitive electrical circuits exposed on one side of the diaphragm which are readily damaged by process gases.
5. Capacitance manometers require costly vacuum compatible electrical feedthroughs to conduct electrical signals through the vacuum wall.
6. Capacitance manometers suffer from hysteresis effects. The pressure indication at a given pressure depends on whether the given pressure is approached by increasing or decreasing the pressure.
7. Capacitance manometers require extreme care in manufacture to assure the thin diaphragm is flat and uniformly stressed and are therefore very costly to manufacture.

Clearly what is required is a manometer which has a wide range, and is immune to overpressure, hysteresis and changes in material properties.

Mechanical Deformation Manometers

The above cited problems of capacitance manometers are largely caused by the use of the diaphragm to provide a mechanical deformation force to oppose the pressure induced force. The same type of problems are inherent in the design disclosed in Soviet Union Patent RU2010201, wherein the opposing force is provided by dual flexible bellows. Although using a deformed flexible member for the function of providing the opposing force is simple in principle, it causes many serious problems in practice. Similar problems are inherent in the design disclosed in U.S. Pat. No. 5,457,999, wherein the opposing force is provided by deforming an elastic vibrating member in tension.

Force Balancing Manometers

Manometers are known which do not depend on mechanical deformation of a flexible member for generating a balancing force to oppose the pressure induced force. These so-called force balancing manometers may be divided into two classes; those which measure a single pressure differential and those which measure multiple pressure differentials.

An example of the first class is disclosed in U.S. Pat. No. 3,657,630 wherein it is proposed to use a relatively large dc current in a flat diaphragm which is immersed in a magnetic field parallel to the diaphragm to provide an opposing force perpendicular to the diaphragm. This design depends critically on providing and maintaining a uniform current density across the diaphragm. Such a requirement is very difficult to achieve in practice and to our knowledge this invention has not found significant use.

An example of the second class is disclosed in U.S. Pat. No. 3,832,618 wherein two pressure differentials with a common pressure are measured and their difference determined. Thus, a third pressure differential is determined and displayed. The common pressure is produced by hydraulic fluid which is throttled and used for damping purposes. This patent for measuring very high pressure differentials does not teach how to accurately measure the very low pressures commonly used in vacuum processing and still achieve wide range. In U.S. Pat. No. 5,457,999 two pressure differentials with a common very low pressure are measured and their difference determined as noted above. However, this design does not employ force balancing and thus suffers from the effects of changes in material properties as noted above under mechanical deformation manometers.

Existing force balancing manometers such as are cited above are seldom if ever used in clean low pressure vacuum processing. This is likely because of lack of stability, inadequate sensitivity and the complexity and the high cost of providing force balancing means in vacuum.

The prior art for measuring multiple pressure differentials does not teach how to simultaneously avoid overpressure problems and still obtain high sensitivity. The prior art also does not teach how to avoid the serious problems of the influence of material property changes on accuracy.

The objectives of the present invention are to provide a force balancing manometer which:

1. Has a very wide differential pressure range suitable for clean vacuum processing.
2. Is relatively immune to over pressure.
3. Has negligible hysteresis.
4. Is relatively insensitive to the effects of changes in material properties with temperature and age.
5. Has position sensing and restoring force means located external to the vacuum.
6. Has no electrical circuits inside the vacuum and therefore no need for vacuum feedthroughs.

SUMMARY OF THE INVENTION

The present invention relates to a force balancing manometer for measuring a differential fluid pressure. The fluid to be measured may be a gas or a liquid, the reference pressure medium may be a like or differing fluid.

The differential pressure is applied to a displaceable force sensing assembly and deviations of the force sensing assembly from a null position are sensed. A servosystem controls a force balancing means acting on the force sensing assembly so as to return the force sensing assembly to a null position. The force required to restore the force sensing assembly to the null position is calibrated to correspond to the differential pressure acting on the force sensing assembly.

The present invention provides a flexibly suspended circular first plate to isolate a first chamber at pressure P1 from the atmosphere and a flexibly suspended circular second plate to isolate a second chamber at pressure P2 from the atmosphere. A rigid link joins the two plates and locates the plates coaxially. The flexibly suspended plates are provided with mechanical stops to limit axial displacement of the plates to a very small range Δx.

The first and second circular plates are preferably flat and relatively thick and stiff. First and second flexible suspension members are preferably very thin shells of revolution of a segment of a circle. A thin shell of revolution has a relatively high spring rate when it is clamped at both its inner and outer edges. However, in accordance with the present invention, it has been found that by clamping the outer edge of a thin shell of revolution and joining the inner edge of the shell to the outer edge of a stiff circular plate that the resulting assembly surprisingly has a very low spring rate but can still withstand relatively high pressure differentials without damage.

A flexible plate with very low spring rate would suffer from the same overpressure problems as a thin diaphragm in a capacitance manometer if mechanical deformation were relied upon to provide the opposing force. The present invention uses force balancing means well known in the art to provide the opposing force. In operation, the flexibly suspended plates are constrained to move within a range of axial displacement Δx where the manometer is extremely sensitive. When the manometer is not in operation the force balancing assembly rests on a mechanical stop.

When the force balancing assembly rests on a stop, the spring rate of the thin shells increases dramatically compared to the spring rate when the assembly is not against a stop. This large change in spring rate is achieved without the need for elaborate accurately shaped stops for the thin shells as are required in capacitance manometers. Only simple mechanical stops are required. When the force balancing assembly rests against a mechanical stop, the thin flexible shells can resist relatively high pressure differentials without damage if the higher pressure is applied to the concave side. When the force balancing means is in operation the thin flexible shells are in effect clamped at their peripheries and can resist relatively high pressure differentials. However, in operation the force balancing assembly in the present invention has a very low spring rate and can thus measure very low pressure differentials as well as relatively high differentials all in the same manometer. The combination of fixed clamping when not in operation plus pseudo clamping by the force balancing means when in operation provides overpressure protection together with high sensitivity. These advantages have not been achieved simultaneously in the prior art.

DESCRIPTION OF THE PREFERRED EMBODIMENTS

Figure 1:
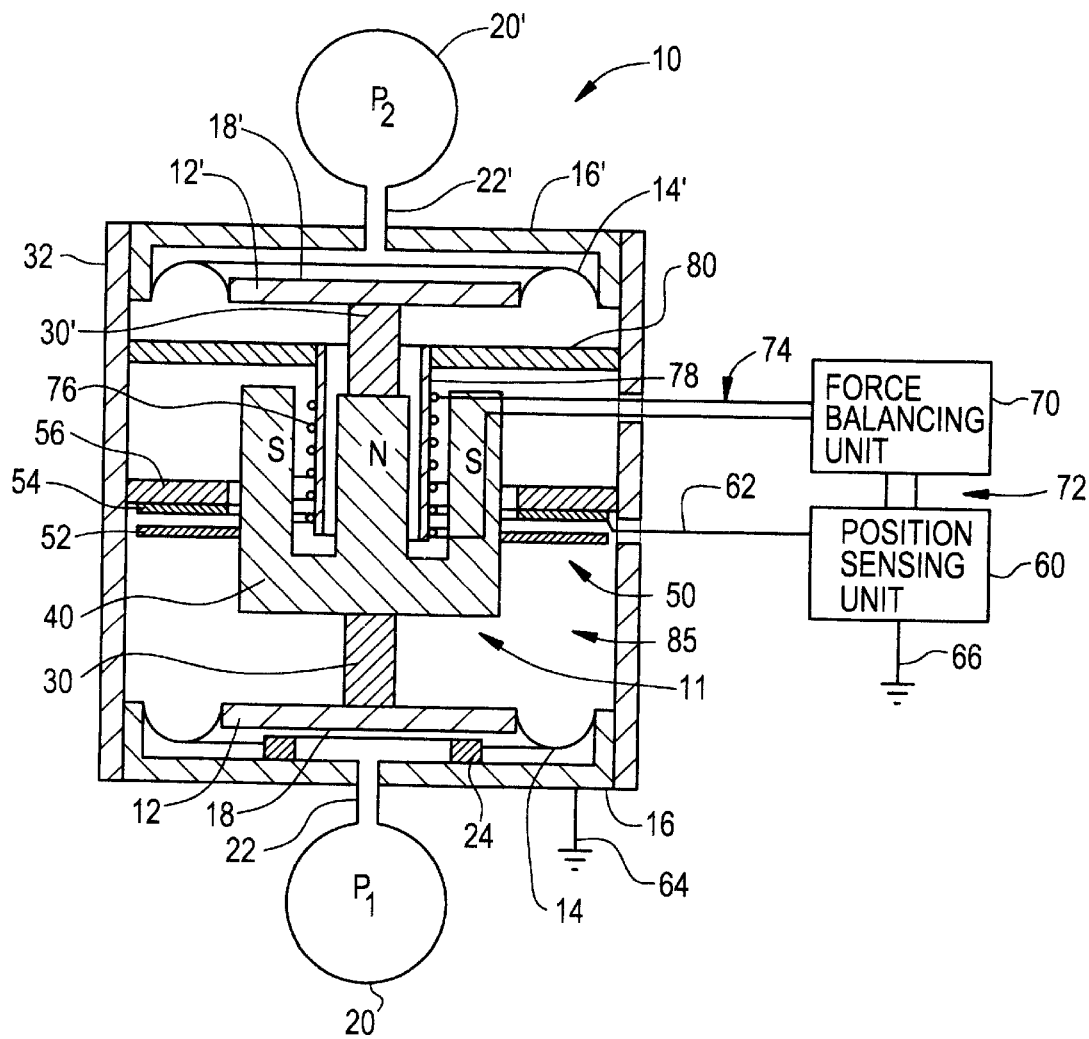
FIG. 1 is a schematic drawing of an illustrative force balancing manometer for measuring a differential fluid pressure in accordance with the present invention.

Referring to the drawings, like elements are designated by like numbers. In FIG. 1 there is shown a schematic drawing of a force balancing manometer 10 for measuring a differential fluid pressure. The fluid to be measured may be a gas or a liquid and is typically present in chamber 20. The reference pressure medium may be a like or differing fluid and is typically within chamber 20' although the fluid to be measured may be in chamber 20' while the reference fluid may be in chamber 20 where the term chamber may include any container of any type. The net force produced by the differential pressure is applied to a displaceable force sensing assembly 11.

The displaceable force sensing assembly 11 is comprised of a first plate 12 attached leak free to the inner periphery of flexible first member 14, a second plate 12' attached leak free to the inner periphery of flexible second member 14', a permanent magnet 40 and rigid links 30 and 30'. Rigid link 30 is rigidly attached to first plate 12 on one end and on the other end to permanent magnet 40. Rigid link 30' is rigidly attached to second plate 12' on one end and on the other end to permanent magnet 40.

Figure 2:
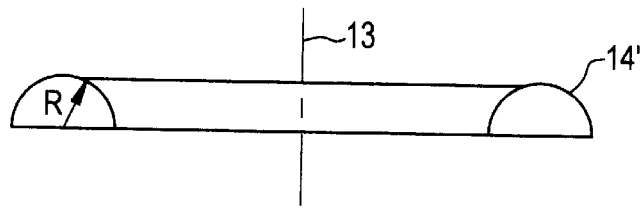
FIG. 2 is a schematic cross-sectional view of a flexible member in accordance with the invention which constitutes a thin shell of revolution where the diameter of the semicircle which is used to generate the shell is perpendicular to the axis of revolution.

Plates 12 and 12' are rigid non-deformable circular metal plates and are mounted coaxially where the thickness of the plates is such as to insure substantial rigidity thereof. Flexible members 14 and 14' are shells of revolution of a segment of a circle wherein the segment and the axis of revolution lie substantially in the same plane as illustrated in FIG. 2. Plate 12 together with flexible member 14 comprise a first pressure deformable member while plate 12' and flexible member 14' comprise a second pressure deformable member. The thickness of said shells 14 and 14' is preferably made about 0.0004 inches to about 0.002 inches and may range from about 0.0003 inches to about 0.010 inches.

The outer periphery of flexible member 14 is attached leak free to first pressure enclosure 16, the diameter of enclosure 16 typically being about 1½ inches, it being understood all dimensional values mentioned in this specification are for purposes of illustration and not limitation on the claims of this application. The outer periphery of flexible member 14' is attached leak free to second pressure enclosure 16'. Enclosures 16 and 16' are rigidly connected to a frame or locating means 32 such that the distance between the enclosures 16 and 16' might typically be about two inches. Face 18 of first plate 12 is exposed to the fluid in first chamber 20 via first fluid connection 22. Face 18' of second plate 12' is exposed to the fluid in second chamber 20' via second fluid connection 22'. A mechanical stop 24 is attached to pressure enclosure 16 to limit the axial displacement of force sensing assembly 11.

Displacement of the force sensing assembly 11 is sensed by capacitor 50 comprised of first capacitor plate 52 and second capacitor plate 54. Position sensing unit 60 is connected to capacitor plate 54 by a connection 62 which is insulated from the frame 32 while capacitor plate 52 is connected to position sensing unit 60 via electrically conductive permanent magnet 40, the electrically conductive rigid link 30, the electrically conductive plate 12, the electrically conductive flexible first member 14, the electrically conductive pressure enclosure 16 and thence to the position sensing unit 60 via the grounds 64 and 66. Second capacitor plate 54 is annular and is rigidly attached to annular insulator 56. Insulator 56 is rigidly attached to frame 32. First capacitor plate 52 is rigidly attached to permanent magnet 40 and therefore undergoes the same displacement as does the force sensing assembly 11.

Force balancing unit 70 supplies current to coil 76 via electrical connections 74 which are insulated from frame 32. Coil 76 is wound on core 78. Core 78 is rigidly attached to core support 80. Core support 80 is rigidly attached to frame 32.

During assembly of force balancing manometer 10 and prior to rigidly linking the plates 12 and 12' coaxially, the common axis of the plates 12 and 12' is set horizontal and P1 and P2 (the respective pressures in chambers 20 and 20') are set equal to the prevailing atmospheric pressure so that the pressure differential across each of plates 12 and 12' is zero. The axial spacing $S_n$ between plates 12 and 12' and the position of first plate 12 relative to said frame 32 is then measured and recorded with said pressure differential equal to zero. The position of first plate 12 relative to frame 32 with zero axial force on first plate is defined as the null position. Mechanical stop 24 is adjusted to be a distance $\Delta Y$ from first plate 12 with first plate 12 in the null position. $\Delta Y$ is preferably about 0.005 to 0.002 inches and may be 0.0005 to 0.005 inches. Rigid links 30 and 30' are then installed to maintain the axial spacing $S_n$.

Also, during assembly of the force balancing manometer 10, the position of the second capacitor plate 52 is adjusted to provide a spacing $D_n$ between capacitor plates 52 and 54 when first plate 12 is in the null position. Spacing $D_n$ is preferably set at about 0.0005 to 0.0015 inches and may range from about 0.0005 to 0.008 inches. The capacitance of capacitor 50 when first plate 12 is in the null position is defined as the null capacitance.

After assembly, force balancing manometer 10 is operated preferably with the axis of force balancing assembly 11 in a vertical orientation. In this orientation with P1=P2, the weight of assembly 11 will cause the assembly to rest on mechanical stop 24 resulting in a capacitance in capacitor 50 smaller than the null capacitance.

The capacitance of capacitor 50 is measured by position sensing unit 60 by means well known in the art. In operation, the capacitance is continuously compared with the null capacitance and a difference signal is produced. The difference signal is sent to the force balancing unit 70 via connections 72. Force balancing unit 70 provides a corresponding current in coil 76. The magnetic field of permanent magnet 40 interacts with the current in coil 76 to produce a balancing force on permanent magnet 40. The balancing force tends to move said plate 12 toward the null position. As the capacitance of capacitor 50 approaches the null capacitance, the difference signal tends to zero.

The resulting current in coil 76 may be accurately related to the prevailing pressure differential P1–P2 by calibrating force balancing manometer 10. First, the current required in coil 76 to restore the capacitance in capacitor 50 to the null capacitance with P1=P2 is measured and preferably stored electronically in the position sensing unit 60.

Then one or more known pressure differentials P1–P2 are created and the current required in coil 76 to restore the capacitance in capacitor 50 to the null capacitance is measured and preferably stored electronically in the position sensing unit 60 for each known pressure differential P1–P2. The required currents and corresponding known pressure differentials P1–P2 are converted to a differential pressure vs. required current calibration curve as is well known in the art.

An unknown pressure differential may then be determined by measuring the current required in coil 76 to restore the capacitance in capacitor 50 to the null capacitance and using the calibration curve to identify the corresponding pressure differential where the current measuring means (not shown) may be disposed in force balancing unit 70.

In operation, the differential pressure is applied to displaceable force sensing assembly 11 and deviations of the force sensing assembly from the null position are sensed by sensing unit 60. A servosystem controls force balancing unit 70 acting on the force sensing assembly 11 so as to return the force sensing assembly to its null position. The force required to restore the force sensing assembly to the null position is calibrated to correspond to the differential pressure acting on the force sensing assembly.

The present invention provides flexibly suspended circular first plate 12 to isolate first chamber 20 at pressure P1 from the atmosphere and a flexibly suspended circular second plate 12' to isolate a second chamber 20 at pressure P2 from the atmosphere. A rigid link joins the two plates and locates the plates coaxially. The flexibly suspended plates are provided with mechanical stop 24 and capacitor plates 52 and 54 to limit axial displacement of the plates to a very small range $\Delta x$. $\Delta x$ is preferably about 0.003–0.006 inches but may range from 0.002 to 0.030 inches.

The first and second circular plates 12 and 12' are preferably flat and relatively thick and stiff. First and second flexible suspension members 14 and 14' are preferably very thin shells of revolution of a segment of a circle. A thin shell of revolution has a relatively high spring rate when it is clamped at both its inner and outer edges. However, it has been found in accordance with the present invention that by clamping the outer edge of a thin shell of revolution such as to pressure enclosure 16 or 16' and joining the inner edge of the shell to the outer edge of a stiff circular plate such as plate 12 or 12' that the resulting assembly surprisingly has a very low spring rate but can still withstand relatively high pressure differentials without damage.

A flexible plate with very low spring rate would suffer from the same overpressure problems as a thin diaphragm in a capacitance manometer if mechanical deformation were relied upon to provide the opposing force. The present invention uses force balancing means such as unit 70 well known in the art to provide the opposing force. In operation, the flexibly suspended plates are constrained to move within a range of axial displacement $\Delta x$ where the manometer is extremely sensitive. When the manometer is not in operation the force balancing assembly rests on mechanical stop 24.

When the force balancing assembly rests on stop 24, the spring rate of the thin shells 14, 14' increases dramatically compared to the spring rate when the assembly is not against a stop. This large change in spring rate is achieved without the need for elaborate accurately shaped stops for the thin shells as are required in capacitance manometers. Only simple mechanical stops are required. When the force balancing assembly rests against a mechanical stop, the thin flexible shells can resist relatively high pressure differentials without damage if the higher pressure is applied to the concave side. When the force balancing means is in operation the thin flexible shells are in effect clamped at their peripheries and can resist relatively high pressure differentials. However, in operation the force balancing assembly in the present invention has a very low spring rate and can thus measure very low pressure differentials as well as relatively high differentials all in the same manometer. The combination of fixed clamping when not in operation plus pseudo clamping by the force balancing means when in operation provides overpressure protection together with high sensitivity. These advantages have not been achieved simultaneously in the prior art.

The dual circular plates 12, 12' are arranged with their flat faces substantially parallel. The effective areas of the flexibly suspended plates are preferably made substantially equal. The plates are joined together by a rigid link comprising rigid links 30, 30', and permanent magnet 40 connected to that face of each plate which is exposed to atmospheric pressure $P_{atm}$ although it should be understood that a pressure other than atmospheric may be employed within the manometer. In this regard, atmospheric pressure is the preferred pressure in that it can be simply introduced in the manometer through the openings through which connections 62 and 74 pass. The chambers 20, 20' are typically arranged in a fixed location relative to rigid frame 32.

As discussed above, during assembly prior to rigidly linking the two plates coaxially, the common axis of the two plates 12, 12' is made horizontal and P1 and P2 in chambers 20 and 20' are set equal to the prevailing atmospheric pressure so that the axial force on each plate is zero. The axial spacing $S_n$ between the plates and the position of the first plate 12 relative to frame 32 are then measured and recorded with zero axial force present. The position of the first plate relative to the frame with zero axial force on the first plate is defined as the null position. The mechanical stop in the first chamber is spaced a distance Δy from the first plate with the first plate in the null position. The rigid link is then installed to maintain the axial spacing $S_n$.

The axial displacement of the plates is preferably measured with a variable capacitor as is well known in the art. As stated above, the capacitor 50 consists of two annular capacitor plates 52 and 54. The first capacitor plate 52 is rigidly attached to the flexibly suspended assembly. The second capacitor plate 54 is rigidly attached to the frame. During assembly the position of the second capacitor plate 54 is adjusted to provide a distance $D_n$ between the capacitor plates when the first plate 52 is in the null position. The capacitance of the position sensing capacitor 50 when the first plate 52 is in the null position is defined as the null capacitance.

In operation, the manometer is operated preferably with the axis of the assembly vertical. In this orientation, with P1=P2, the weight of the assembly will cause the assembly to rest on the lower stop 24 resulting in a capacitance much smaller than that corresponding to null position. When not in operation the capacitor plates 52 and 54 may function as a mechanical stop for displacement in one direction.

The resulting difference in capacitance corresponding to the null position and the capacitance at any other position of the force balancing assembly is used to electronically control force balancing unit 70 which exerts a force on the plates 12, 12' to return the plates to their null position. Force balancing means well known in the art may be used wherein an electrical current in a coil immersed in a magnetic field generates a balancing force.

In operation, there is a pressure difference ($P_{atm}$–P1) across the first plate producing a force F1 directed toward the first chamber where $$F1=(P_{atm}-P1)a_{e1}$$

and $a_{e1}$ is the effective area of the flexibly suspended first plate. In operation there is a pressure difference ($P_{atm}$–P2) across the second plate producing a force F2 directed toward the second chamber where $$F2=(P_{atm}-P2)a_{e2}.$$

If $$a_{e1}=a_{e2},$$

the net pressure force on the dual plate assembly is $$F1-F2=-(P1-P2)a_{e2}.$$

Directed toward that chamber with the lower pressure.

When P1>P2 there will be a net pressure related force normal to the surface of the plates 12, 12' directed towards the lower pressure region which net force will cause the plates to be displaced from the null position. The additional current required to counterbalance the net pressure related force can be related to the pressure difference P1–P2 by calibration as has been described above and is well known in the art.

As shown in FIG. 2, one embodiment of the present invention provides a thin shell of revolution to suspend each plate where the diameter of the semi-circle which is used to generate the shell is perpendicular to the axis of revolution 13. It has been found in accordance with the present invention that flexible suspensions with this geometry can readily be made from extremely thin sheet metal and still withstand relatively high pressure differences when all surfaces exposed to high pressure are concave. For example, a stainless steel flexible member with such preferred geometry and outside diameter of 1.5 inches and a thickness of only 0.001 inches will be stressed to only approximately 3600 psi when subjected to atmospheric pressure differential. Under the same conditions a flat diaphragm of the same thickness and outside diameter in a conventional capacitance manometer will be stressed to over 1,000,000 psi. Such a high stress will, of course, cause the diaphragm to burst. The flat diaphragm is subject to large bending moments whereas a thin shell of revolution of a segment of a circle is subject to negligible bending moments.

Figure 3:
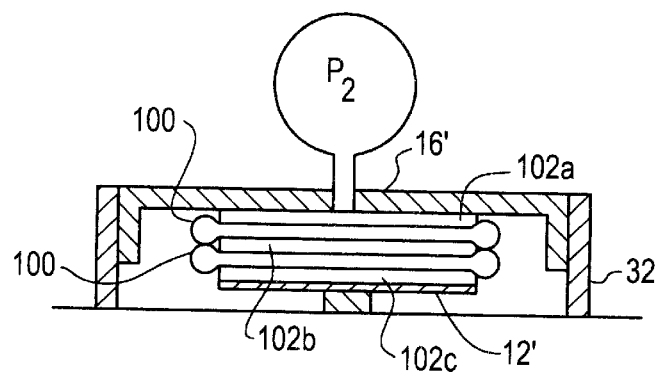
FIG. 3 is a schematic cross-sectional view of another embodiment of the invention wherein multiple shells are joined on their inner peripheries to short cylindrical spacers for measuring lower pressure differentials.

As shown in FIG. 3, when the lowest pressure differentials are to be measured (for example, less than $10^{-4}$ Torr), multiple shells of revolution 100 may be employed to provide a very small spring rate where each shell may be nearly circular in cross section, two shells being shown for purposes of illustration where the number of shells may vary. The multiple shells may be joined on their inner peripheries to short inflexible spacers 102a, 102b, and 102c where the spacers may be cylindrical in configuration and where spacer 102a is sealingly connected at its upper surface to pressure enclosure 16' and at its lower surface is sealingly connected to the upper shell 100 shown in FIG. 3. Intermediate spacer 102b is connected at its upper surface to the lower surface of the upper shell 100 and at its lower surface to the upper surface of the lower shell 100. Cylindrical spacer 102c is connected at its upper surface to the lower surface of the lower shell 100 and to plate 12' at its lower surface.

The arrangement shown in FIG. 3 would be duplicated at the lower end of the manometer with respect to plate 12 and pressure enclosure 16. Where the shells 100 utilized at both the upper and lower portions of the manometer would have the same characteristics as that of the shells 14 and 14' of FIG. 1, the only difference being that the shells 14 and 14' constitute semicircular segments of a complete circle while the shells 100 of FIG. 3 are larger segments of a circle such that they are nearly circular, as described above.

The spacers 102a, 102b and 102c are not flexible and thus the flexibility of the arrangement of FIG. 3 results from the flexibility of the shells 100.

Because the suspended plate assembly has a very small spring rate in the null position, extremely small pressure differentials can be readily measured. Higher pressure differentials can also be readily measured by simply increasing the balancing force. Because of the special geometry of the flexible suspensions, reasonable over pressure does not affect the accuracy of the device as commonly occurs with diaphragm manometers which rely on metal deformation to provide the opposing force. Simple mechanical stops restrict the displacement of the plates to a very small range when the restoring force means is not active and when overpressure is present. Thus, objectives 1 and 2 of the present invention mentioned hereinbefore are achieved by using thin shells of revolution with a circular segment cross-section concave on the high pressure side.

Because the restoring force is generated by means independent of the material properties of said plates and flexible members, the new device of the present invention provides pressure measurement which is not influenced by changes in material properties. Thus, the new device is significantly more stable than prior art devices which depend on maintaining material properties unchanged to preserve stability. Thus, objectives 3 and 4 of the present invention mentioned hereinbefore are met by the combination of the above features.

A preferred embodiment of the present invention provides for locating the position sensing means (capacitor 50) and the force balancing means (permanent magnet 40 and coil 76) between plates 12 and 12'. Thus, all required electrical circuitry may be located outside the vacuum at atmospheric pressure. Therefore, there is no need for costly and troublesome vacuum feedthroughs from the atmosphere side of the device to the vacuum side. Locating all of the position sensing and force balancing means outside the vacuum also avoids the creation of additional vacuum surfaces which if present would hinder pumpdown. Thus, the present invention achieves objectives 4 and 5 mentioned hereinbefore.

Locating the force balancing means (permanent magnet 40 and coil 76) midway between the plates minimizes several other problems as will now be explained. In order to minimize power dissipation in the force balancing means and the resulting temperature rise in the manometer, it is desirable to maintain very close spacing between the magnet 40 and the coil 76. It is also desirable for the flexibly suspended assembly 11 to move freely and not rub against the fixed coil. However, in order to measure very low pressures, very thin flexible suspensions are required which tend to yield readily to small torque on the assembly, produced, for example, by vibration.

The present invention uses dual flexibly suspended plates 12 and 12' spaced relatively far apart axially so as to provide a large rotational spring rate about the midpoint of the axis between the circular plates where the spacing should preferably be at least about 70% of the outer diameter of the first and second pressure deformable members. Thus, the present invention is relatively immune to small torque on the displaceable portion of the manometer quite unlike the behavior of the device described in Soviet Union Patent RU2010201. Therefore, the spacing between the magnet 40 and coil 76 may be made very small for optimum force balancing with minimum power. By locating the force balancing means (magnet 40 and coil 76) midway between the plates much smaller clearances between the magnet and coil may be used. With this location for the force balancing means, a significant advantage is obtained without increasing the overall axial length of the manometer.

In U.S. Pat. No. 3,832,618 mentioned hereinbefore, a mechanical link of unspecified length is disclosed which connects two differential pressure capsules. In U.S. Pat. No. 5,457,999 a mechanical link is disclosed which is longer than the length of an elastic vibrating member in tension employed to determine the pressure differential.

The present invention provides for preferably locating the position sensing capacitor plates 52 and 54 midway between the circular plates for the same reason as described above for locating the force balancing means (magnet 40 and coil 76) midway between the circular plates 12 and 12'. The spacing between the capacitor plates 52 and 54 may be made much smaller than if the capacitor plates were located elsewhere along the axis of the circular plates for the same rotational displacement of the axis. Closer spacing results in higher capacitance and thus improves the capability of resolving smaller axial displacements and thus lower pressures. By using two electromagnets the capacitor plates may be located optimally on axis and midway between the plates 12 and 12' as shown in FIG. 4.

Figure 4:
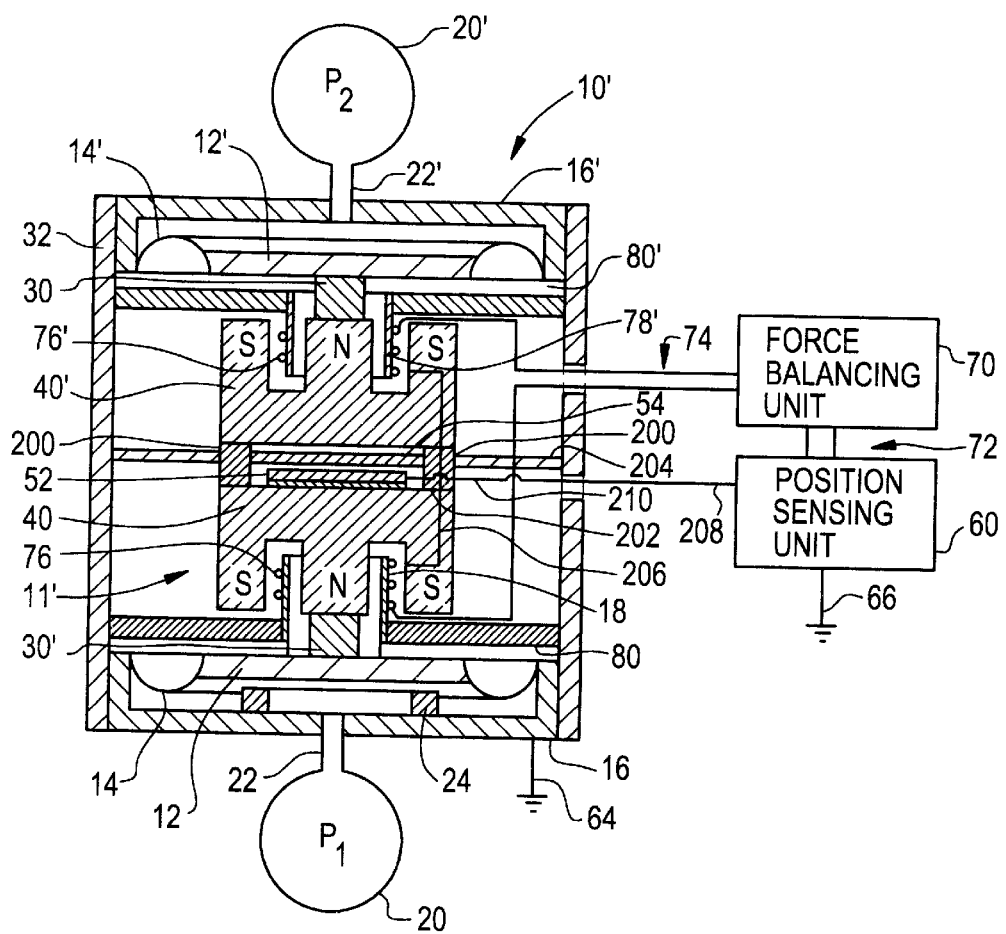
FIG. 4 is a schematic illustration of a further embodiment of the invention wherein two electromagnets are employed to facilitate location of capacitor plates optimally on axis and midway within the manometer.

Referring to FIG. 4, two electromagnets 40 and 40' are illustrated where the magnets are separated by a plurality of posts 200 where typically three or four posts are disposed around the periphery of the magnets 40 and 40'. Movable capacitor plate 52 is mounted on permanent magnet 40 and electrically insulated therefrom by insulating spacer 202. Stationary capacitor plate 54 is fixedly mounted with respect to frame 32 by electrically conductive plate 204 where plate 204 is provided with a plurality of openings 210 through which the posts 200 pass to thereby permit movement of the magnets 40 and 40' with respect to frame 32 while capacitor plate 52 remains stationary with respect thereto.

The electrical connection 74 from and to force balancing unit 70 extends through the upper coils 76' and thence via Line 206 to the coils 76 and then back to the force balancing unit where line 206 is appropriately insulated.

Moreover, the electrical connection from position sensing unit 60 to capacitor plates 52 and 54 is such that a direct connection is made via insulated line 208 to movable plate 52 while the connection to stationary plate 54 is via ground 66, ground 64, pressure enclosure 16, frame 32, electrically conductive support plate 204 and thence to the stationary capacitor plate 54. From the foregoing, it can be seen that the capacitor plates 52 and 54 are located optimally on the manometer axis and midway between the plates 12 and 12'.

Each shell used for the suspension responds predictably in a direction parallel to the axis of the plates but because each shell is very thin, each shell has a tendency to deform non-predictably when exposed to lateral or radial forces. It has been in accordance with the invention found that spacing the plates relatively far apart and tying them rigidly together significantly decreases the tendency to buckle. Thus, placing the force restoring means (magnet 40 and coil 76) between the plates 12 and 12' rather than beyond one plate decreases the lever arm acting on the plates and helps to decrease torque on the suspensions and thus helps prevent buckling. This major benefit is also achieved without increasing the overall length of the device.

As stated hereinbefore, the effective areas of the flexibly suspended plates 12, 12' are preferably made substantially equal. However, by making one of the plates substantially larger than the other, the absolute pressure may be measured where the pressures in chambers 20 and 20' to be measured would be substantially equal and where the pressure in the space 85 between plates 12 and 12' would be different from that of the pressure in chambers 20 and 20'. For instance, the space between plates 12 and 12' could be evacuated rather than having atmospheric pressure therein.

As also stated hereinbefore, it should be understood that the various dimensional values given hereinbefore such as those for $\Delta x$, $\Delta Y$, $D_n$, the thickness of the shells of revolution, the manometer dimensions, etc. are intended to be illustrative and not limiting on the present invention.

What is claimed is:

1. An apparatus for measuring the differential pressure between at least two fluids comprising:
   (a) first and second pressure enclosures in respective communication with said two fluids;
   (b) first and second pressure deformable members where the first deformable member is sealingly connected with respect to said first pressure enclosure and second deformable member is sealingly connected with respect to said second pressure enclosure and said pressure deformable members are rigidly linked so as to move as one unit;
   (c) a frame for locating said first and second pressure enclosures in fixed relationship to one another;
   (d) position sensing means for determining the displacement of said pressure deformable members relative to said frame;
   (e) force balancing means comprising a first portion rigidly connected with respect to said frame and a moveable second portion connected with respect to said pressure deformable members;
   (f) transducing means for transducing said displacement of said first and second pressure deformable members into a force acting on said moveable second portion of said force balancing means in a direction to decrease said displacement;
   wherein said first pressure deformable member comprises a substantially nonflexible circular first plate sealingly connected to at least one substantially flexible first shell of revolution where said first shell is concave on one surface thereof and said second pressure deformable member comprises a substantially nonflexible circular second plate sealingly connected to at least one substantially flexible second shell of revolution where said second shell is concave on one surface thereof.

2. An apparatus as in claim 1 wherein said first and second non-flexible circular plates are coaxial.

3. An apparatus as in claim 1 wherein said first and second shells of revolution each have a thickness of about 0.0003 inches to about 0.010 inches.

4. An apparatus as in claim 3 where said thickness is from about 0.0004 inches to about 0.002 inches.

5. An apparatus as in claim 1 wherein said first and second shells of revolution each have a shape generated by revolving a segment of a circle about an axis of revolution where said axis is in substantially the same plane as the plane of said segment.

6. An apparatus as in claim 1 wherein said first and second shells of revolution each have substantially identical dimensions.

7. An apparatus as in claim 1 wherein the area of said first pressure deformable member exposed to said first pressure enclosure is substantially equal to the area of said second pressure deformable member exposed to said second pressure enclosure.

8. An apparatus as in claim 1 wherein the area of said first pressure deformable member exposed to said first pressure enclosure is substantially larger than the area of said second pressure deformable member exposed to said second pressure enclosure.

9. An apparatus as in claim 8 wherein the pressure in a first space defined by said first pressure enclosure and said first pressure deformable member is substantially equal to the pressure in a second space defined by said second pressure enclosure and said second pressure deformable member and the pressure in a third space between the first and second non-flexible plates is different from that in said first and second spaces.

10. An apparatus as in claim 1 wherein the axial distance between said first and second non-flexible circular plates is greater than about 0.7 times the outer diameter of said first and second pressure deformable members.

11. An apparatus as in claim 1 wherein said force balancing means is positioned between said first and second pressure deformable members.

12. An apparatus as in claim 1 wherein said shells of revolution are each concave on the surface exposed to higher pressure.

13. An apparatus as in claim 12 where said higher pressure is atmospheric pressure.

14. An apparatus as in claim 1 wherein a plurality of said flexible shells of revolution are separated by inflexible sections sealingly connected at the inner peripheries of said shells.

15. An apparatus as in claim 1 wherein said position sensing means is positioned substantially midway between said first and second pressure deformable members.

16. An apparatus as in claim 1 wherein said position sensing means is positioned substantially on said axis and midway between said first and second pressure deformable members.

17. An apparatus as in claim 1 wherein the current in said force balancing means is initially decreased as said differential pressure is increased from zero.

18. An apparatus as in claim 1 wherein said first shell of revolution is concave everywhere on said one surface thereof and said second shell of revolution is concave everywhere on said one surface thereof.

19. An apparatus as in claim 1 including stop means for limiting the displacement of said first and second pressure deformable members.

20. An apparatus as in claim 19 wherein said stop means limits the axial displacement $\Delta x$ of said first and second nonflexible circular plates from about 0.002 inches to about 0.030 inches.

21. An apparatus as in claim 20 wherein $\Delta x$ is about 0.003 inches to about 0.006 inches.

22. An apparatus as in claim 19 wherein the distance $\Delta Y$ of said stop means from one of said first or second nonflexible circular plates is about 0.0005 inches to about 0.005 inches when said one plate is in a null position corresponding to zero axial force on said one plate.

23. An apparatus as in claim 22 wherein said distance $\Delta Y$ is about 0.0005 inches to about 0.002 inches.

24. An apparatus as in claim 1 wherein said position sensing means comprises a first capacitor plate and a second capacitor plate wherein one of said capacitor plates is in a fixed relationship with respect to said frame and the other one of said capacitor plates is in a moveable relationship with respect to said frame.

25. An apparatus as in claim 24 wherein the distance $D_n$ between said first and second capacitor plates is about 0.0005 inches to about 0.008 inches when said other one of said capacitor plates is in a null position corresponding to zero axial force on said non-flexible first and second plates.

26. An apparatus as in claim 25 where said distance $D_n$ is about 0.0005 inches to about 0.0015 inches.

27. An apparatus as in claim 1 wherein said first portion of said force balancing means comprises at least one current carrying coil and said moveable second portion of said force balancing means comprises at least one permanent magnet which interacts with said current carrying coil.

28. An apparatus as in claim 27 wherein said position sensing means comprises a first capacitor plate and a second capacitor plate wherein one of said capacitor plates is in a fixed relationship with respect to said frame and the other one of said capacitor plates is connected to said permanent magnet.

29. An apparatus as in claim 28 wherein said moveable second portion of said force balancing means comprises two permanent magnets where one of said two permanent magnets is connected to said first pressure deformable members and the other one of said two permanent magnets is connected to said second pressure deformable member.

30. An apparatus as in claim 29 wherein said position sensing means comprises a first capacitor plate and a second capacitor plate wherein one of said capacitor plates is in a fixed relationship with respect to said frame and the other one of said capacitor plates is connected to one of said two permanent magnets.

31. Apparatus as in claim 1 where said transducing means includes a position sensing unit responsive to said position sensing means for generating an electrical signal indicative of said displacement of the pressure deformable members relative to said frame and a force balancing unit responsive to said electrical signal for generating said force acting on said moveable second portion of said force balancing means.

32. An apparatus for measuring the differential pressure between at least two fluids respectively disposed in first and second chambers comprising:

(a) first and second pressure deformable members where the first deformable member is sealingly connected with respect to said first chamber and second deformable member is sealingly connected with respect to said second chamber and said pressure deformable members are rigidly linked so as to move as one unit;

(b) locating means for locating said first and second chambers in fixed relationship to one another;

(c) position sensing means for determining the displacement of said pressure deformable members relative to said locating means;

(d) force balancing means comprising a first portion rigidly connected with respect to said locating means and a moveable second portion connected with respect to said pressure deformable members;

(e) transducing means for transducing said displacement of said first and second pressure deformable members into a force acting on said moveable second portion of said force balancing means in a direction to decrease said displacement;

wherein said first pressure deformable member comprises a substantially nonflexible circular first plate sealingly connected to at least one substantially flexible first shell of revolution where said first shell is concave on one surface thereof and said second pressure deformable member comprises a substantially nonflexible circular second plate sealingly connected to at least one substantially flexible second shell of revolution where said second shell is concave on one surface thereof.

33. An apparatus as in claim 32 wherein said first and second non-flexible circular plates are coaxial.

34. An apparatus as in claim 32 wherein said first and second shells of revolution each have a thickness of about 0.0003 inches to about 0.010 inches.

35. An apparatus as in claim 34 where said thickness is from about 0.0004 inches to about 0.002 inches.

36. An apparatus as in claim 32 wherein said first and second shells of revolution each have a shape generated by revolving a segment of a circle about an axis of revolution where said axis is in substantially the same plane as the plane of said segment.

37. An apparatus as in claim 32 wherein said first and second shells of revolution each have substantially identical dimensions.

38. An apparatus as in claim 32 wherein the area of said first pressure deformable member exposed to said first chamber is substantially equal to the area of said second pressure deformable member exposed to said second chamber.

39. An apparatus as in claim 32 wherein the area of said first pressure deformable member exposed to said first chamber is substantially larger than the area of said second pressure deformable member exposed to said second chamber.

40. An apparatus as in claim 39 wherein the pressures in said first and second chambers are substantially equal and the pressure in a space between the first and second non-flexible plates is different from that in the first and second chambers.

41. An apparatus as in claim 32 wherein the axial distance between said first and second non-flexible circular plates is greater than about 0.7 times the outer diameter of said first and second pressure deformable members.

42. An apparatus as in claim 32 wherein said force balancing means is positioned between said first and second pressure deformable members.

43. An apparatus as in claim 32 wherein said shells of revolution are each concave on the surface exposed to higher pressure.

44. An apparatus as in claim 43 where said higher pressure is atmospheric pressure.

45. An apparatus as in claim 32 wherein a plurality of said flexible shells of revolution are separated by inflexible sections sealingly connected at the inner peripheries of said shells.

46. An apparatus as in claim 32 wherein said position sensing means is positioned substantially midway between said first and second pressure deformable members.

47. An apparatus as in claim 32 wherein said position sensing means is positioned substantially on said axis and midway between said first and second pressure deformable members.

48. An apparatus as in claim 32 wherein the current in said force balancing means is initially decreased as said differential pressure is increased from zero.

49. An apparatus as in claim 32 wherein said first shell of revolution is concave everywhere on said one surface thereof and said second shell of revolution is concave everywhere on said one surface thereof.

50. An apparatus as in claim 32 including stop means for limiting the displacement of said first and second pressure deformable members.

51. An apparatus as in claim 50 wherein said stop means limits the axial displacement $\Delta x$ of said first and second nonflexible circular plates from about 0.002 inches to about 0.030 inches.

52. An apparatus as in claim 51 wherein $\Delta x$ is about 0.003 inches to about 0.006 inches.

53. An apparatus as in claim 50 wherein the distance $\Delta Y$ of said stop means from one of said first or second nonflexible circular plates is about 0.0005 inches to about 0.005 inches when said one plate is in a null position corresponding to zero axial force on said one plate.

54. An apparatus as in claim 53 wherein said distance $\Delta Y$ is about 0.0005 inches to about 0.002 inches.

55. An apparatus as in claim 32 wherein said position sensing means comprises a first capacitor plate and a second capacitor plate wherein one of said capacitor plates is in a fixed relationship with respect to said locating means and the other one of said capacitor plates is in a moveable relationship with respect to said locating means.

56. An apparatus as in claim 55 wherein the distance $D_n$ between said first and second capacitor plates is about 0.0005 inches to about 0.008 inches when said other one of said capacitor plates is in a null position corresponding to zero axial force on said non-flexible first and second plates.

57. An apparatus as in claim 56 where said distance $D_n$ is about 0.0005 inches to about 0.0015 inches.

58. An apparatus as in claim 32 wherein said first portion of said force balancing means comprises at least one current carrying coil and said moveable second portion of said force balancing means comprises at least one permanent magnet which interacts with said current carrying coil.

59. An apparatus as in claim 58 wherein said position sensing means comprises a first capacitor plate and a second capacitor plate wherein one of said capacitor plates is in a fixed relationship with respect to said locating means and the other one of said capacitor plates is connected to said permanent magnet.

60. An apparatus as in claim 58 wherein said moveable second portion of said force balancing means comprises two permanent magnets where one of said two permanent magnets is connected to said first pressure deformable members and the other one of said two permanent magnets is connected to said second pressure deformable member.

61. An apparatus as in claim 60 wherein said position sensing means comprises a first capacitor plate and a second capacitor plate wherein one of said capacitor plates is in a fixed relationship with respect to said locating means and the other one of said capacitor plates is connected to one of said two permanent magnets.

62. Apparatus as in claim 32 where said transducing means includes a position sensing unit responsive to said position sensing means for generating an electrical signal indicative of said displacement of the pressure deformable members relative to said locating means and a force balancing unit responsive to said electrical signal for generating said force acting on said moveable second portion of said force balancing means.

* * * * *